(No Model.) 2 Sheets—Sheet 1.
O. LUNN.
HARROW.
No. 397,193. Patented Feb. 5, 1889.
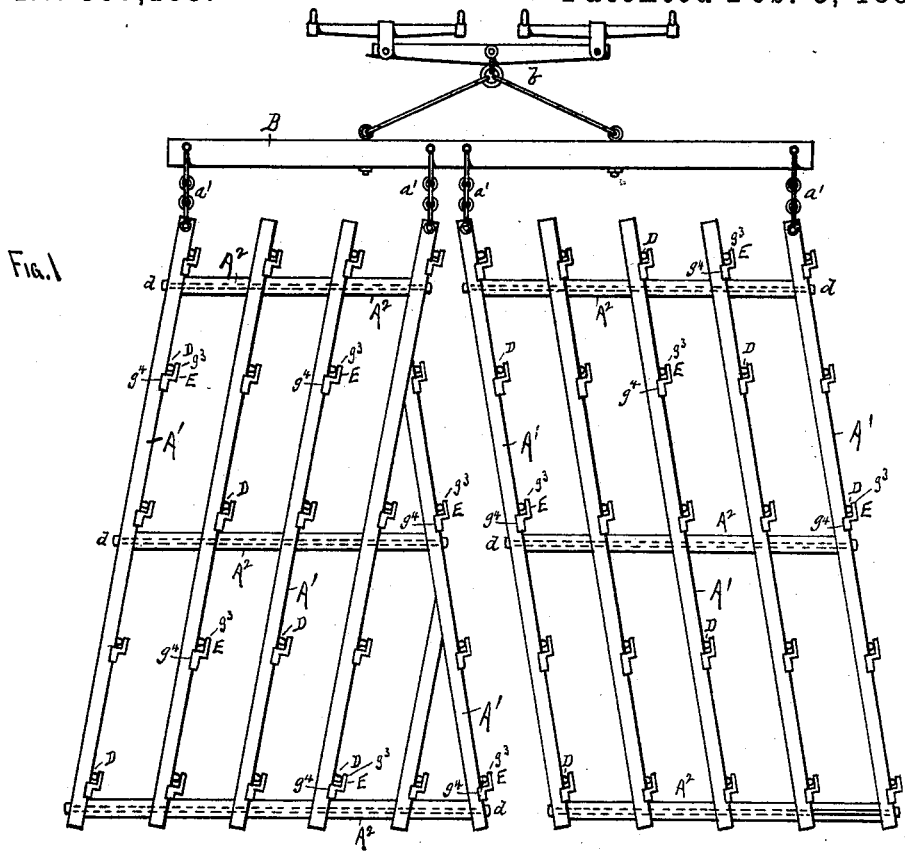
Fig. 1
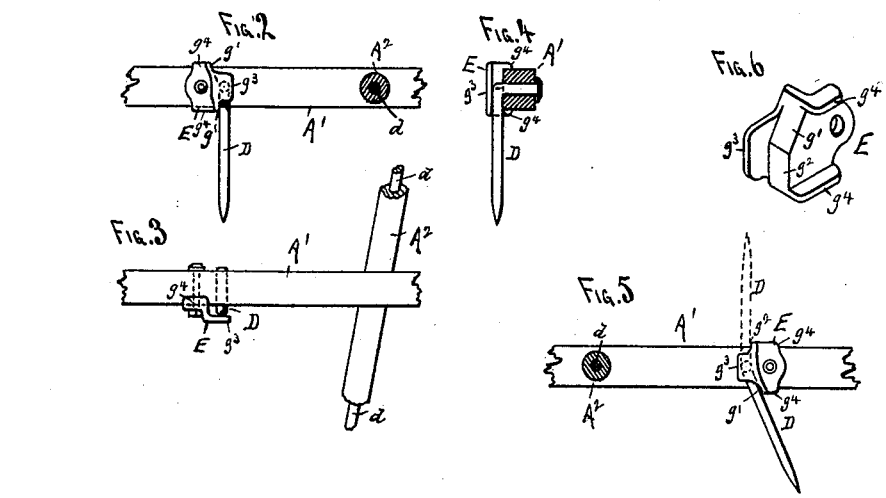
WITNESSES.
Morley E. Keough.
H. S. Webster.
Osmon Lunn,
INVENTOR BY
Charles H. Woodward
Atty.

(No Model.) 2 Sheets—Sheet 2.
O. LUNN.
HARROW.
No. 397,193. Patented Feb. 5, 1889.
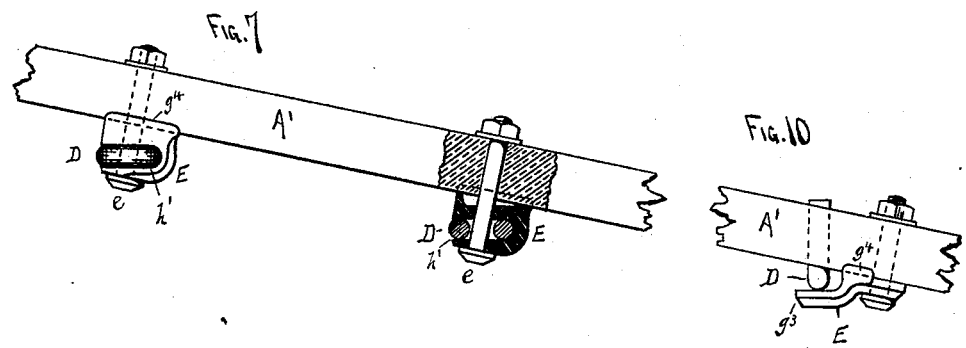
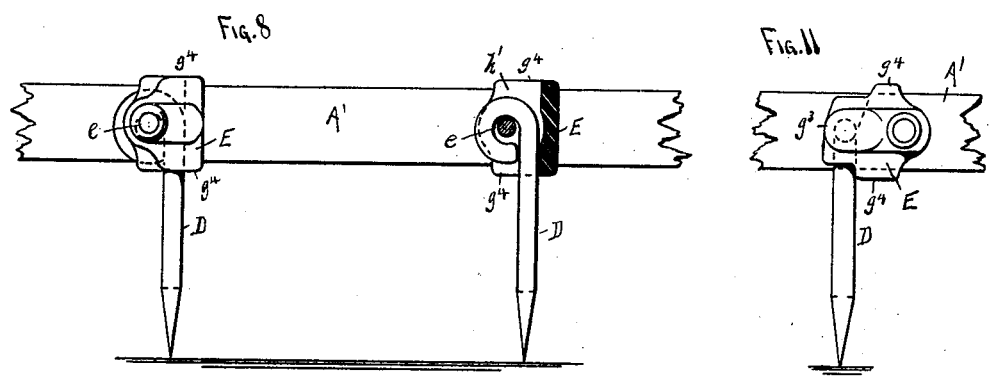
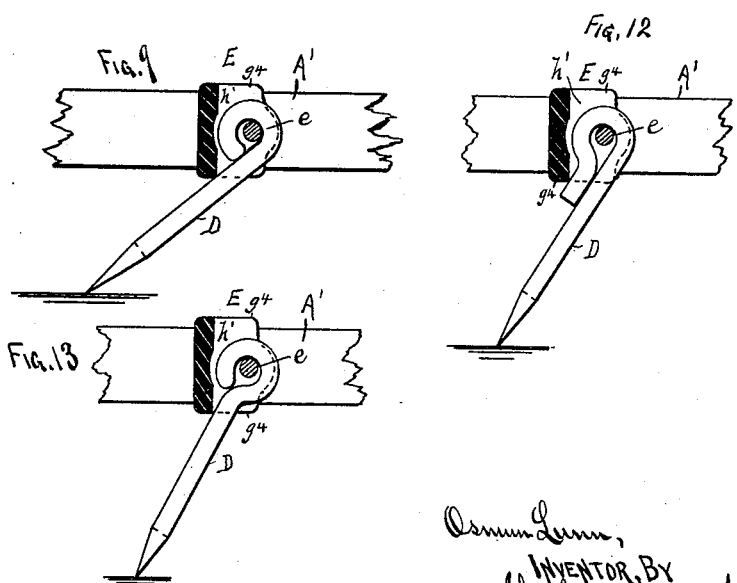
WITNESSES.
H. S. Webster
Geo. D. Huff
Osmun Lunn,
INVENTOR. BY
Charles N. Woodward
Atty.

UNITED STATES PATENT OFFICE.

OSMON LUNN, OF ST. PAUL, MINNESOTA.

HARROW.

SPECIFICATION forming part of Letters Patent No. 397,193, dated February 5, 1889.

Application filed April 16, 1888. Serial No. 270,717. (No model.)

*To all whom it may concern:*

Be it known that I, OSMON LUNN, a citizen of the United States, residing at St. Paul, in the county of Ramsey and State of Minnesota, have invented certain new and useful Improvements in Harrows, of which the following is a specification.

This invention relates to harrows; and it consists in the manner of constructing and arranging the teeth and the means for connecting them to the tooth-bars, whereby when one face of the harrow is downward the teeth will operate at right angles to the tooth-bars, and when the harrow is reversed, or with the other face downward, the teeth will operate at a backwardly-slanting angle to the bars, and without changing the position of the draft-rods or evener, as hereinafter shown and described, and specifically pointed out in the claims.

In the drawings, Figure 1 is a plan view of the harrow complete, turned so that the teeth stand at a right angle to the tooth-bars. Figs. 2, 3, and 4 are enlarged sectional details illustrating more fully the construction. Fig. 5 is a view similar to Fig. 2, showing the tooth-bar reversed, so that the teeth slant backward at an angle. Fig. 6 is an enlarged perspective view of one of the tooth-holding plates or keepers detached. Figs. 7, 8, 9, 10, 11, 12, and 13 are enlarged detail views illustrating some slight modification in the construction.

The tooth-bars A' may be arranged in any desired form and coupled together in any suitable manner; but generally they will be arranged, as shown in Fig. 1, with two or more sections connected by flexible couplings $a'$ to a common evener, B, the draft being applied by draft rods or chains $b$ to the evener.

In the drawings, Fig. 1, the individual tooth-bars are connected to each other by rollers or circular wooden bars $A^2$, having rods $d$ passing through them, the use of the rollers causing the harrow to present the same appearance above and below. The teeth D are shown formed of the ordinary pointed round steel or iron, and, in Figs. 1, 2, 3, 4, 5, 10, and 11, with their upper ends bent over at right angles and passed through holes in the tooth-bars A', so that the teeth are free to revolve alongside the tooth-bars.

In Figs. 7, 8, 9, 12, and 13 the upper ends of the teeth are shown bent around bolts $e$, which pass through the tooth-bars, and also through "keepers" E; but the operation of the teeth is the same in both constructions.

Upon the tooth-bars A', close to each of the teeth, is bolted a plate or keeper, E, the face of the keeper, when constructed as shown in Fig. 6, next the tooth, being slanted away from the tooth upon one side of the center line of the tooth-bar and at right angles to the tooth-bar upon the other side of the center line of the tooth-bar, (these two surfaces being shown at $g'$ $g^2$ in Fig. 6,) so that when the tooth-bars are turned so that the surfaces $g'$ are downward the teeth will slant backward, as in Fig. 5, and when the tooth-bar is turned so that the surfaces $g^2$ are downward the teeth will be held at right angles to the tooth-bars, as shown in Fig. 2. The two surfaces $g'$ $g^2$ thus form stops to limit the motion of the teeth. A lip, $g^3$, will be formed upon each of the keepers E, to project over the teeth and prevent them from slipping out of the tooth-bars, the lips thus enabling me to dispense with any other fastening to hold the teeth in the tooth-bars. Small lips $g^4$ will also be formed upon each of the keepers E, to project over the edges of the tooth-bars to prevent the keepers swinging upon the bolts $e$, the lips $g^4$ thus enabling me to fasten the keepers to the bars with only one bolt each.

In Figs. 7, 8, 9, 12, and 13 the keeper is shown constructed with a slot, $h'$, at an angle to the tooth-bar, and in this slot the tooth is pivoted by the bolts $e$, this construction causing the teeth to oscillate upon the bolt in a line parallel with the line of draft, instead of at an angle thereto, as in Figs. 1, 2, and 3. This same result may be accomplished by merely boring the holes for the bent-over upper ends of the teeth at an angle to the tooth-bars and at right angles to the line of draft, as in Figs. 10 and 11.

In the construction shown in Figs. 7, 8, and 9 the surfaces $g'$ $g^2$ need not be slanted backward, as in Fig. 6, as the manner of forming the eye in the tooth D renders it unnecessary, as shown in Fig. 9; but the long bearings to support the teeth are present in both constructions.

The keepers E may be formed in two or more parts, if preferred, each part forming a separate stop, and they may also be arranged to permit the teeth to assume any desired angle. I prefer the construction shown, however, as the surfaces $g'$ $g^2$ form long supports or bearings for the teeth, and thus increase their strength. By this simple construction the harrow may be employed either as a pulverizing or smoothing harrow by being turned so that the teeth stand at right angles to the tooth-bars, as in Figs. 1, 2, and 8, when used to pulverize the soil, and turned so that the teeth slant backward and drag over the ground, as in Figs. 5 and 9, when used merely as a smoothing-harrow. This twofold capacity is of great advantage in harrows, especially in harrowing corn-ground, where the old "corn-hobs" are a source of great annoyance, and also in harrowing young corn, where it is only necessary to drag lightly over the soil and not tear it loose.

In changing the harrow it is only necessary to lift up the forward end by the evener and singletree and turn it over backward, with the former upper surface downward, when the teeth will automatically assume their proper position. The harrow is thus always drawn from the same end, thereby greatly simplifying the operation.

Having thus described my invention, what I claim as new is—

1. In a harrow, the tooth-bars having the teeth pivoted thereon and adapted to project beyond either side thereof, in combination with keepers E, having stop-surfaces $g'$ $g^2$ and stop-lips $g^3$, adapted to keep said teeth in place, substantially as and for the purpose set forth.

2. In a harrow, the tooth-bars having the teeth pivoted thereon and adapted to project beyond either side thereof, in combination with keepers E, having stop-surfaces $g'$ $g^2$, stop-lips $g^3$, and ribs $g^4$, whereby said teeth are held in place and said keepers secured to said bars by one bolt only in each, substantially as and for the purpose set forth.

In testimony whereof I have hereunto set my hand in the presence of two subscribing witnesses.

OSMON LUNN.

Witnesses:
C. N. WOODWARD,
H. S. WEBSTER.